(12) United States Patent
Chu et al.

(10) Patent No.: US 7,619,704 B2
(45) Date of Patent: Nov. 17, 2009

(54) DISPLAY DEVICE HAVING A PIXEL UNIT WITH A TRANSMISSIVE AREA AND TRANSREFLECTIVE AREA

(75) Inventors: Cheng-Jen Chu, Tainan (TW); Fu-Cheng Chen, Tainan (TW)

(73) Assignee: Chi Mei Optoelectronics Corp. (TW)

( * ) Notice: Subject to any disclaimer, the term of this patent is extended or adjusted under 35 U.S.C. 154(b) by 438 days.

(21) Appl. No.: 11/430,360

(22) Filed: May 9, 2006

(65) Prior Publication Data

US 2006/0250553 A1    Nov. 9, 2006

(30) Foreign Application Priority Data

May 9, 2005    (TW) ............................... 94114902 A

(51) Int. Cl.
*G02F 1/1335* (2006.01)
(52) U.S. Cl. ........................................ 349/114; 349/96

(58) Field of Classification Search ............. 349/96–98, 349/114
See application file for complete search history.

(56) References Cited

U.S. PATENT DOCUMENTS

| 6,671,016 B1 * | 12/2003 | Kim ........................... 349/115 |
| 6,909,479 B2 * | 6/2005 | Iijima ......................... 349/109 |
| 7,253,858 B2 * | 8/2007 | Moon ......................... 349/115 |

* cited by examiner

*Primary Examiner*—Dung T. Nguyen
(74) *Attorney, Agent, or Firm*—Trop Pruner & Hu, P.C.

(57) ABSTRACT

A display device has a lower substrate, an upper substrate located above and generally parallel with the lower substrate, and a plurality of pixel units located between the lower and upper substrates. Each pixel unit of the display device includes a transmissive area and a transreflective area. The transmissive area allows light to pass through, while the transreflective area includes a light selecting membrane to selectively allow light having a first characteristic to pass through, and reflect light having a second characteristic.

21 Claims, 12 Drawing Sheets

DISPLAY DEVICE HAVING A PIXEL UNIT WITH A TRANSMISSIVE AREA AND TRANSREFLECTIVE AREA

CROSS REFERENCE TO RELATED APPLICATION

This claims the benefit under 35 U.S.C. § 119 of Taiwan patent application No. 94114902, filed May 9, 2005.

TECHNICAL FIELD

The current invention relates generally to a display device having a pixel unit with a transmissive area and transreflective area.

BACKGROUND

In general, liquid crystal display (LCD) devices can be divided into the following three categories according to use of different sources of lighting: (1) transmissive, (2) reflective, and (3) transreflective. A transmissive LCD device typically has a backlight source for generating light. The light generated by the backlight source passes through the liquid crystal unit and various optical components (such as a polarizer) to illuminate a picture in the LCD device that is viewable by a user. A reflective LCD device has a reflecting surface (formed of aluminum, for example). Light (such as ambient light or light from a front light source) enters the reflective LCD device from the front of the panel, passes through the liquid crystal unit and various optical components, and is reflected by the reflecting surface. The reflected light travels through the liquid crystal unit and the various optical components to illuminate a picture in the LCD device that is viewable by a user.

A transreflective LCD device features characteristics of both transmissive and reflective LCD devices; when ambient light is relatively strong or when weaker light is desired for display, the LCD device can turn off the backlight source and display the picture in a reflective mode by using the ambient light as the light source. However, when the ambient light is relatively weak or when stronger light is desired for display, the transreflective LCD device can turn on the backlight source and display the picture in the transmissive mode.

Conventional transreflective LCD devices either use a transreflective reflector for reflecting the ambient light from outside so that the LCD device can display the picture in a reflective mode, or allow the light generated by the backlight source to pass through a transreflective reflector so that the LCD device can display the picture in a transmissive mode. The transreflective reflector reflects part of the light and allows the rest of the light to pass through.

As shown in the example of FIG. 1, which is a schematic drawing of the basic configuration of a typical transreflective LCD device 1, the transreflective LCD device 1 includes: an upper polarizer 2, a retardation film 4, an upper glass substrate 6, an upper transparent electrode 8, a liquid crystal layer 10, a lower transparent electrode 11, a lower glass substrate 12, a light diffuser 13, and a reflecting polarizer 14. The reflecting polarizer 14 includes a multi-layered dielectric film which reflects light when ambient light 9 is used as the light source, or allows light from a backlight source (not shown) to pass through when the backlight source is used.

A conventional technique used in some LCD devices involves the use of different liquid crystal cell gaps to achieve the effects of transmission and reflection. FIG. 2 shows a conventional transreflective LCD panel with different liquid crystal cell gaps. In the transmissive area, a transparent ITO electrode 17 is used, while in the reflective area, a metal layer 18 that can reflect the light is used as an electrode. A liquid crystal layer 19 has different layer thicknesses at different locations. The liquid crystal cell gap in the reflective area is half (or even less) of the liquid crystal cell gap in the transmissive area. The arrangement depicted in FIG. 2 includes dual gaps. An upper polarizer and lower polarizer 15 and an upper and a lower quarter-wave plate 16 in the display area cooperate to provide the transmissive and reflective effects. However, the manufacture process for forming the dual gap configuration is often complicated and difficult.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 4:
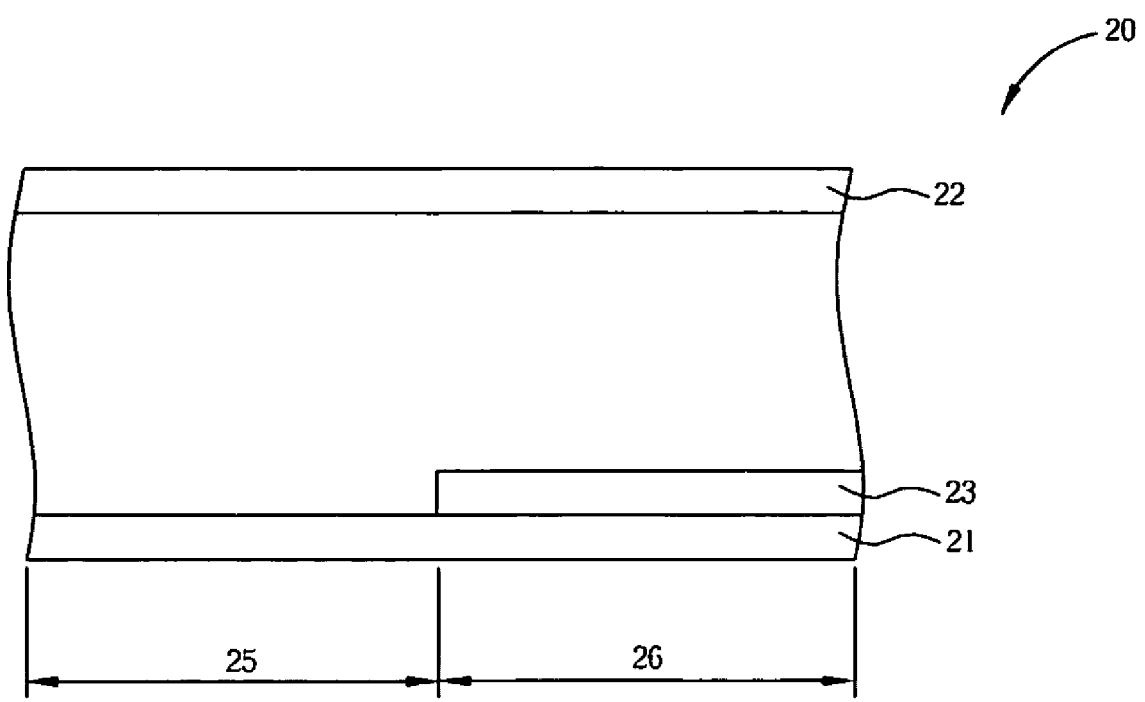
FIG. 4 is a schematic diagram of a portion of a display panel according to an embodiment.

According to some embodiments, a transreflective display device, such as a liquid crystal display (LCD) device, includes an array of pixel units, with each pixel unit having a transmissive area and a transreflective area. The trasnsreflective area includes a light selecting membrane (e.g., a circular polarized light selecting membrane) that enables light having a first characteristic (e.g., first polarization) to pass through, but that reflects light having a second characteristic (e.g., second polarization), FIG. 4 shows a transreflective liquid crystal display (LCD) panel 20 according to some embodiments of the invention. The panel 20 includes a lower substrate 21, an upper substrate 22, and a plurality of pixel units arranged between the lower and upper substrates. One pixel unit is depicted in FIG. 4. The pixel units are arranged in an array of rows and columns. The upper substrate 22 is located above and is generally parallel (within manufacturing tolerances) with the lower substrate 21. The substrates can be glass substrates. Each pixel unit includes a transmissive area 25 and a transreflective area 26. While the transmissive area 25 generally allows all light to pass through, the transreflective area 26 includes a circular polarized light selecting membrane 23 that selectively allows light having a first characteristic (e.g., first polarization) to pass through, but reflects light having a second characteristic (e.g., a second polarization). The circular polarized light selecting membrane 23 can include, for example, a helical cholesteric liquid crystal. A right-handed rotation cholesteric liquid crystal reflects right-handed rotation circular polarized light while allowing left-handed rotating polarized light to pass through.

There is no specific restriction on the ratio between the transmissive area 25 and the transreflective area 26, or on the shape of those two areas which can be adjusted as appropriate based on a transmissive or reflective index to achieve a desired visual effect.

Figure 1:
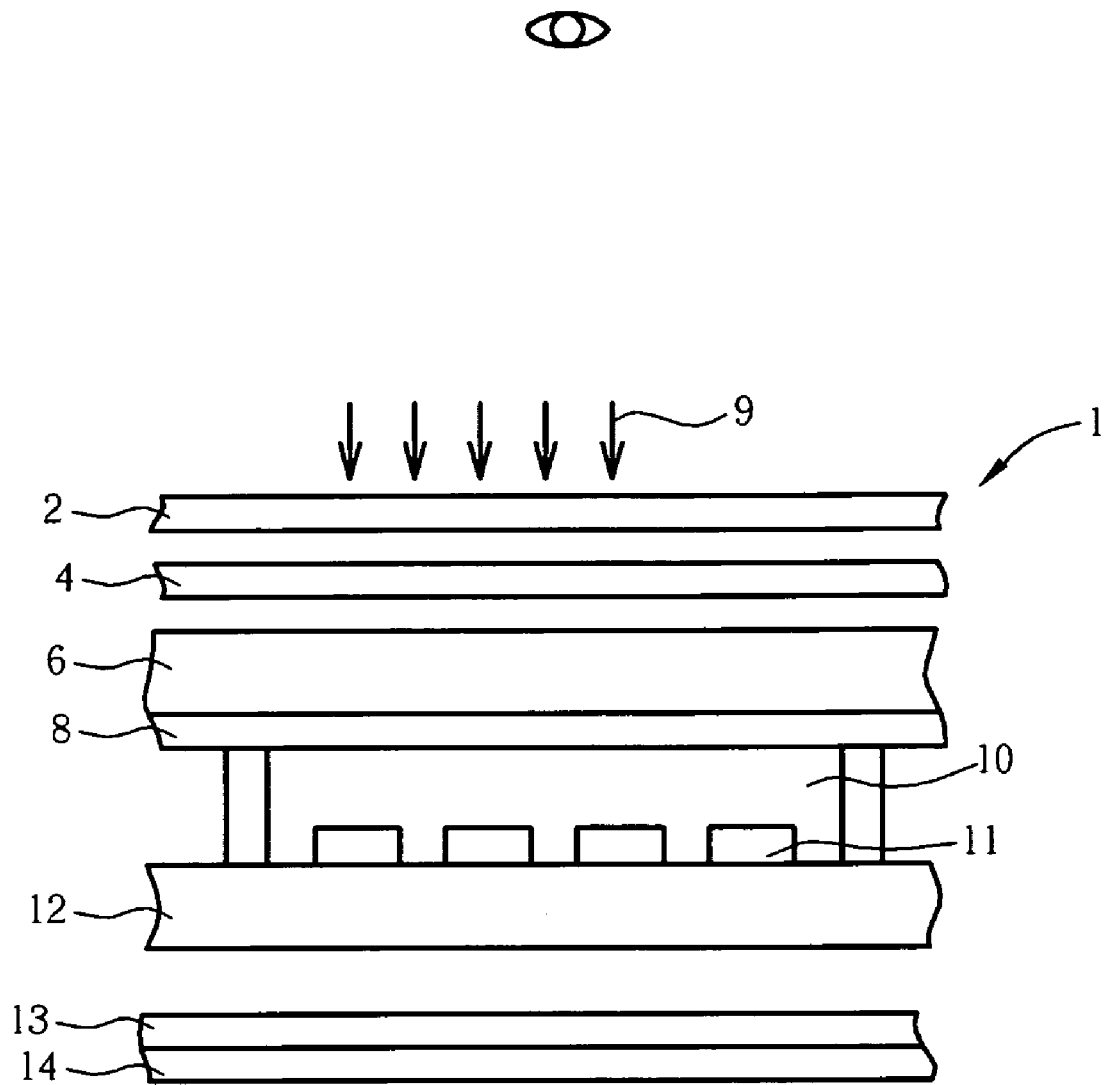
FIG. 1 is a schematic diagram of the basic configuration of a conventional transreflective LCD.
Figure 2:
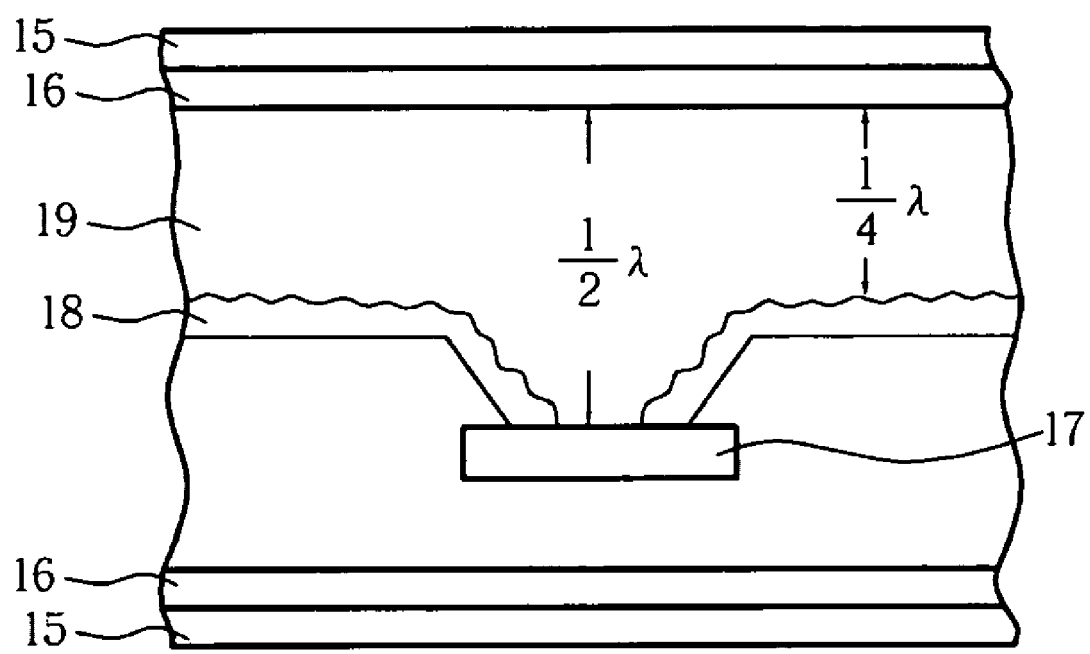
FIG. 2 is a schematic diagram of the basic configuration of another conventional transreflective LCD.
Figure 3:
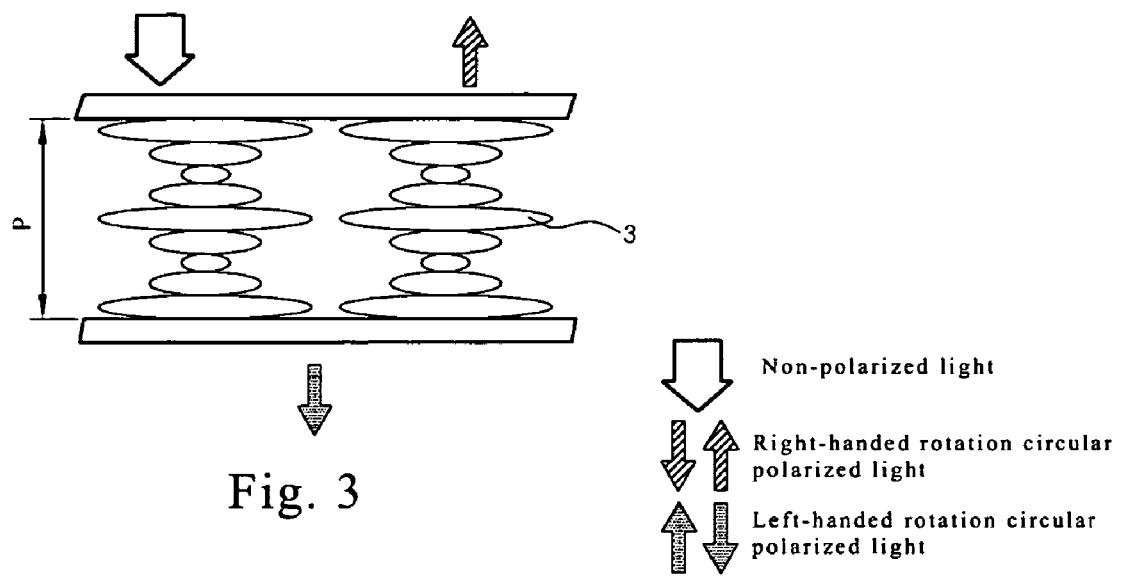
FIG. 3 is a schematic diagram of the structure of a cholesteric liquid crystal used in some embodiments of the invention.

A cholesteric liquid crystal has cells that are aligned by a slight rotation of the long axis of a nematic liquid crystal cell. The distance required for a 360-rotation of the long axis of the liquid crystal is called spiral distance or pitch. This spiral structure allows linear polarized light of the visible light to pass through the structure in a polarized mode and causes the polarization plane to rotate within the plane in the direction of the vertical spiral axis. Therefore, this liquid crystal has the property of optical rotation polarization that can be either right-handed or left-handed depending on its structure, and can produce a reflective effect or a transmissive effect. FIG. 3 shows a right-handed rotation cholesteric liquid crystal. The pitch of the liquid crystal is P. Assuming the wavelength of the incident light is $\lambda$, the refractive index of this cholesteric liquid crystal is n, and $\lambda = P \times n/4$. A part of the light will be reflected as right-handed circular polarized light, and another part of light will pass through the cholesteric liquid crystal as left-handed circular polarized light. The cholesteric liquid crystal is generally used as chiral agent for the twisted nematic (TN) and super twisted nematic (STN) liquid crystal material of an LCD device.

Figure 5:
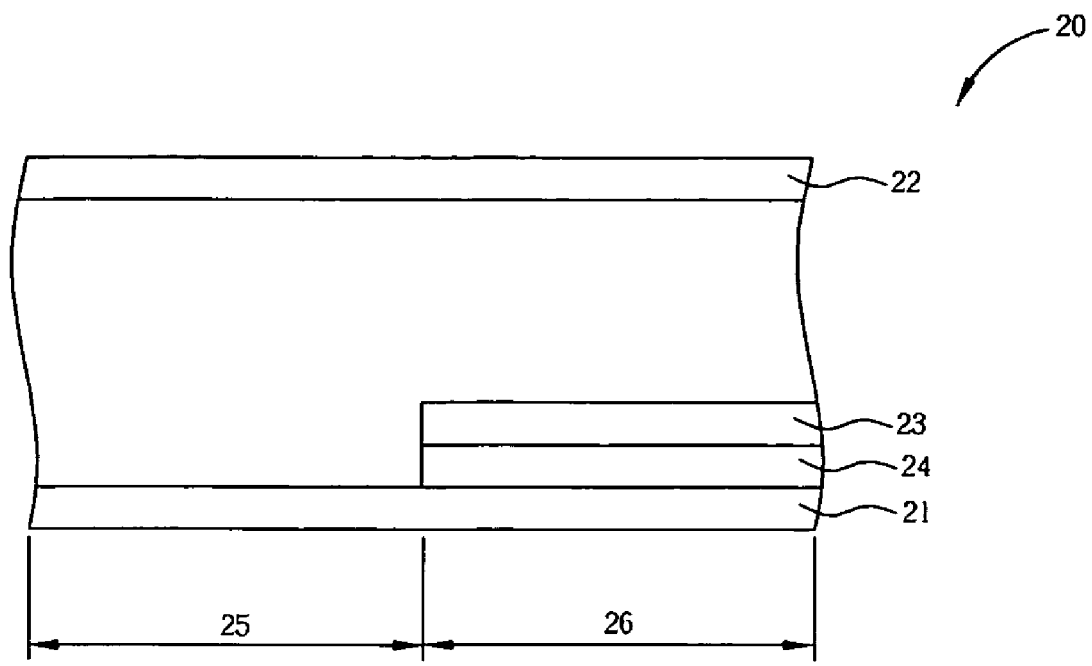
FIG. 5 is a schematic diagram of a portion of a display panel according to another embodiment.

FIG. 5 shows that the transreflective area 26, in an alternative embodiment, can further include a light absorption layer 24. The light absorption layer 24 absorbs light that has passed through the circular polarized light selecting membrane 23, and prevents light penetrating through the circular polarized light selecting membrane 23 from causing other reflections in the pixel unit, thus reducing or avoiding light leakage. The light absorption layer 24 can be positioned between the lower substrate 21 and the circular polarized light selecting membrane 23, or under the lower substrate 21. The light absorption layer 24 can be made of, for example, black resin or other light absorbing materials.

Figure 6:
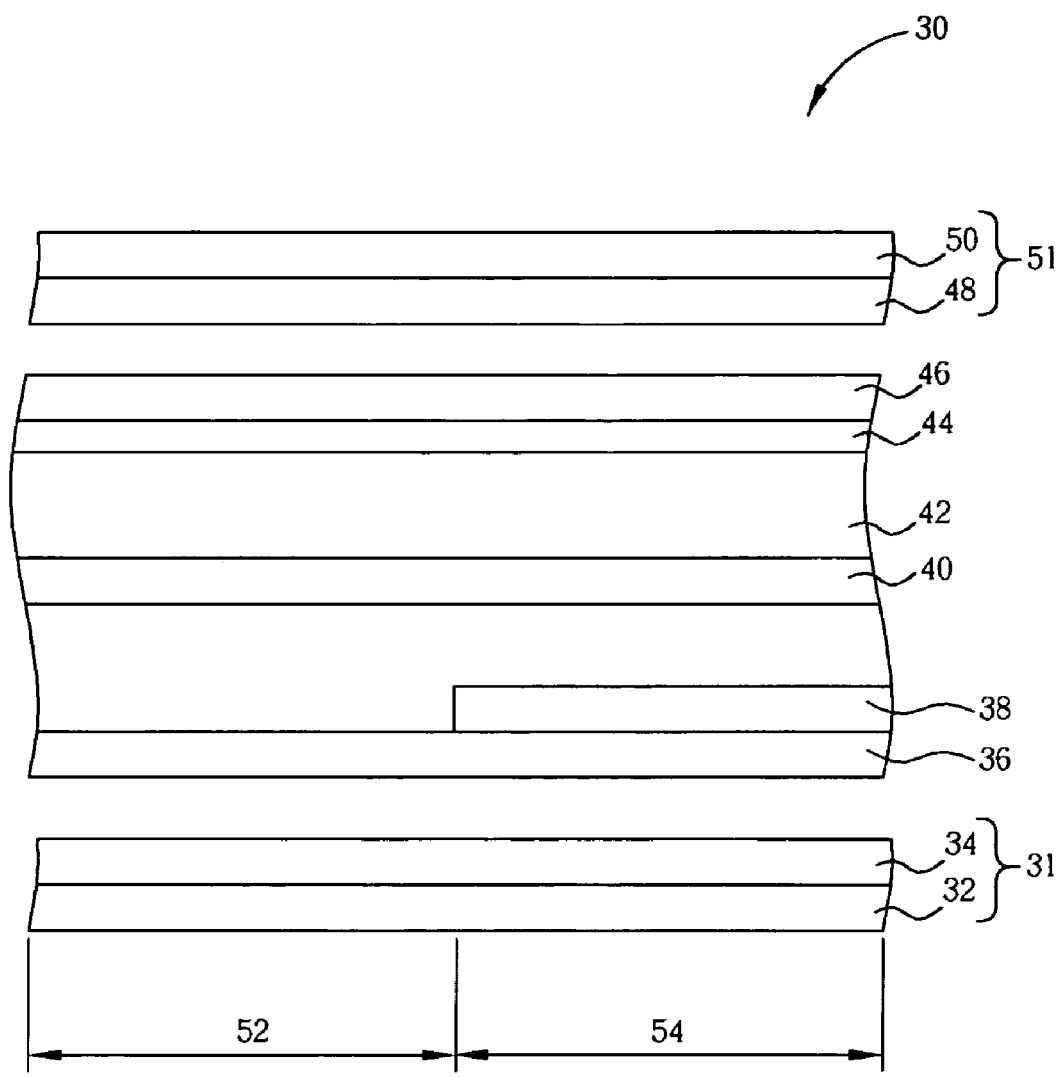
FIG. 6 is a schematic diagram of a liquid crystal display (LCD) device according to an embodiment.

FIG. 6 shows an LCD device 30 according to an embodiment that includes a lower substrate 36, a first circular polarized light generation device 31 located under the lower substrate 36, an upper substrate 46 located above and generally parallel to the lower substrate 36, a second circular polarized light generation device 51 located above the upper substrate 46, and a plurality of pixel units arranged between the lower substrate 36 and the upper substrate 46. One pixel unit is depicted in FIG. 6. The upper and lower substrates 46, 36 can be glass substrates in some embodiments.

Each pixel unit includes an upper transparent electrode 44, a liquid crystal layer 42, and a lower transparent electrode 40. The upper electrode 44 and the lower electrode 40 are transparent electrodes which can be, for example, ITO. Each pixel unit also has a transmissive area 52 and a transreflective area 54. While the transmissive area 52 allows light to pass through, the transreflective area 54 includes a circular polarized light selecting membrane 38 that allows light having a first polarization to pass through but reflects light having a second polarization. The circular polarized light selecting membrane 38 in the transreflective area 54 according to an embodiment is a left-handed rotation cholesteric liquid crystal that reflects left-handed rotation circular polarized light, but allows right-handed rotation circular polarized light to pass through, so that the liquid crystal cell gap (the thickness of the liquid crystal layer) will satisfy Equation 1 below:

$$\Delta n \times d = \lambda/2 \quad \text{(Equation 1)}$$

where d is the thickness of the liquid crystal layer 42, $\lambda$ is the wavelength of the light, and $\Delta n$ is the difference between the extraordinary refractive index $n_e$ and the ordinary refractive index $n_o$ ($\Delta n = n_e - n_o$) of liquid crystals contained in the liquid crystal layer. The first circular polarized light generation device 31 includes a first linear polarizer 32 and a first retardation film 34. The second polarized light generation device 51 similarly includes a second linear polarizer 50 and a second retardation film 48. In one embodiment, each retardation film 34, 48 can be a quarter-wave plate. The first linear polarizer 32 and the first retardation film 34 are combined to form a left-handed rotation circular polarized light generation device, and the second linear polarizer 50 and the second retardation film 48 are combined to form a right-handed rotation circular polarized light generation device.

There is no specific restriction on the ratio between the transmissive area 52 and the transreflective area 54, or on the shape of those two areas which can be adjusted as appropriate based on the transmissive or reflective index for achieving a better or desired visual effect. The thickness of the liquid crystal layer is such that the thickness of the liquid crystal layer multiplied by the difference between the ordinary refractive index and the extraordinary refractive index of the liquid crystals contained in the liquid crystal layer is between 0 and ½ of the wavelength of the incident light.

Figure 7:
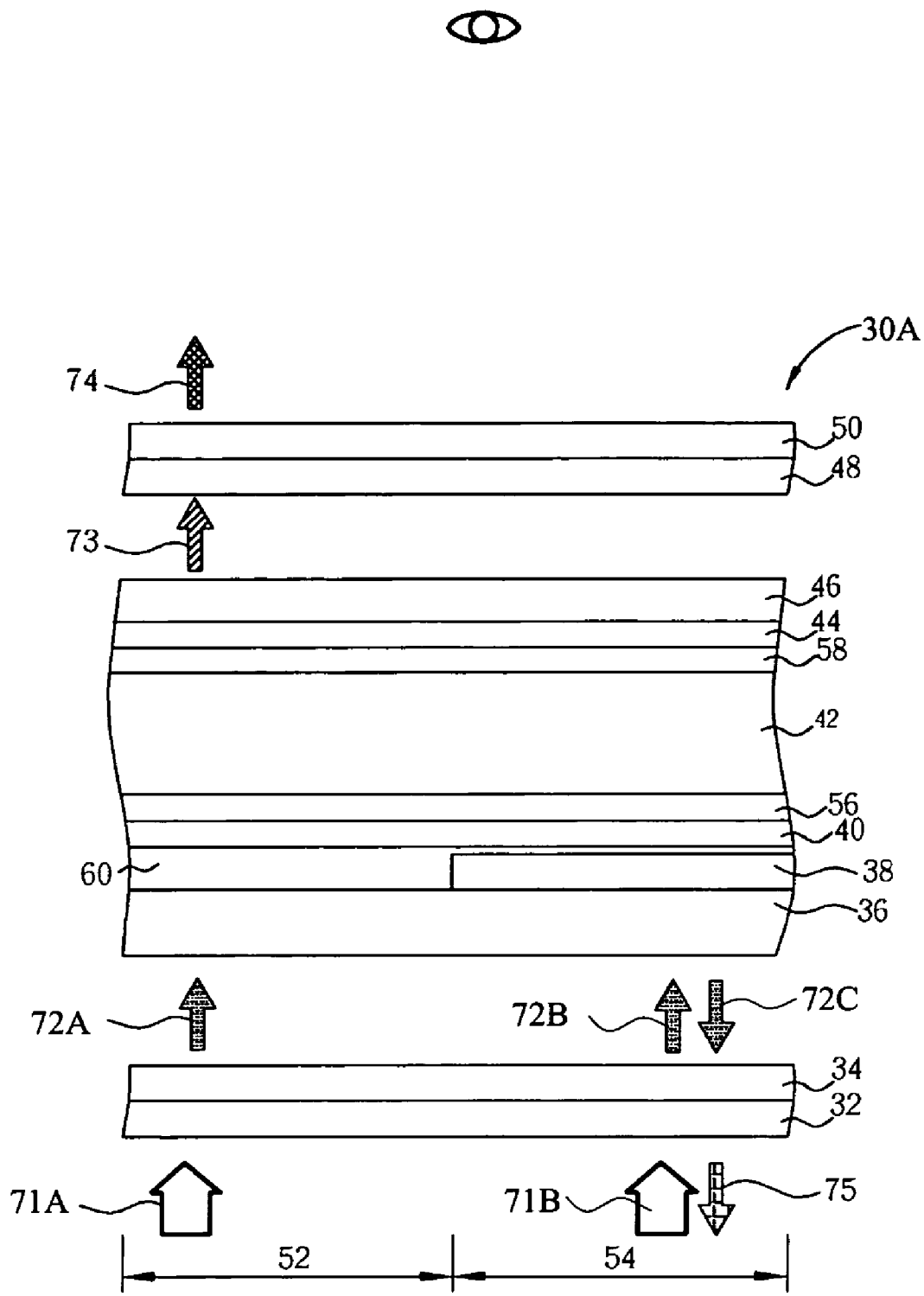
FIG. 7 is a schematic diagram of an LCD device according to another embodiment.

FIG. 7 illustrates an LCD device 30A according to another embodiment. The LCD device 30A includes the components depicted in FIG. 6 (having common reference numerals), and further includes an upper alignment film 58 and a lower alignment film 56. Each alignment film can be made of polyimide, and is located on the upper and lower surfaces of the liquid crystal layer 42, respectively.

The FIG. 7 arrangement also includes an overcoat layer 60 formed on the circular polarized light selecting film 38 and the lower substrate 36 to protect the circular polarized light selecting membrane 38, and to create a flat and smooth surface that is beneficial to the formation of the lower transparent electrode 40. The overcoat layer 60 can be made of, for example, transparent films such as resin.

As depicted in FIG. 7, when the light source is a backlight source, non-polarized light 71A and 71B are produced, where the non-polarized light 71A is directed through the transmissive area 52 of the pixel unit, and the non-polarized light 71B is directed through the transreflective area 54 of the pixel unit. The non-polarized light 71A travels up through the left-handed rotation first linear polarizer 32 to generate a linear polarized light that passes the first retardation film 34 to form a left-handed rotation circular polarized light 72A. The left-handed rotation circular polarized light 72A passes up through the glass plate 36, the overcoat 60, the lower transparent electrode 40, and the lower alignment film 56 while remaining a left-handed rotation circular polarized light all the way through these layers. The light further travels through the liquid crystal layer 42. Since the liquid crystals in the liquid crystal layer 42 are horizontally aligned when not subjected to any voltage (in other words, zero voltage is applied), and assuming that the thickness of the liquid crystal layer 42 is such that the thickness (d) of the liquid crystal layer multiplied by the difference between the ordinary refractive index and the extraordinary refractive index ($\Delta n$) of the liquid crystals contained in the liquid crystal layer is ½ of the wavelength of the incident light, the liquid crystal layer 42 can function to retard the light wave phase by 180°. Therefore, when the left-handed rotation circular polarized light 72A passes through the liquid crystal layer 42, the light becomes a right-handed rotation circular polarized light, which then travels up through the upper alignment film 58, the upper transparent electrode 44, and the upper substrate 46 while remaining a right-handed rotation circular polarized light 73. The light 73 further travels through the second retardation film 48 to form a linear polarized light. Since this linear polarized light has the same direction as the second linear polarizer 50, the linear polarized light can pass through the second linear polarizer 50 and form linear polarized light 74 to allow a user to view a brighter state display region in the transmissive area 52 of the pixel unit.

In the transreflective area 54 of the pixel unit, left-handed rotation circular polarized light 72B is formed from the non-polarized light 71B after traveling through the first retardation film 34. The polarized light 72B travels through the transreflective area 54 of the pixel unit. This left-handed rotation circular polarized light 72B passes through the lower glass substrate 36 and arrives at the circular polarized light selecting membrane 38. Since the circular polarized light selecting membrane 38 includes a left-handed rotation cholesteric liquid crystal, the selecting membrane 38 does not allow the left-handed rotation circular polarized light to pass through. Instead, the left-handed rotation circular polarized light is reflected back as light 72C, which travels down to pass the lower glass substrate 36 and becomes a linear polarized light after passing the first retardation film 34. The linear polarized light continues to travel through the first linear polarizer 32 to form the linear polarized light 75. Therefore, what the user views in the transreflective area 54 of the pixel unit is a darker state display region. The darker state display region in the transreflective area 54 is combined with the brighter state display region in the transmissive area 52 to achieve a combined brighter state display image.

Figure 8:
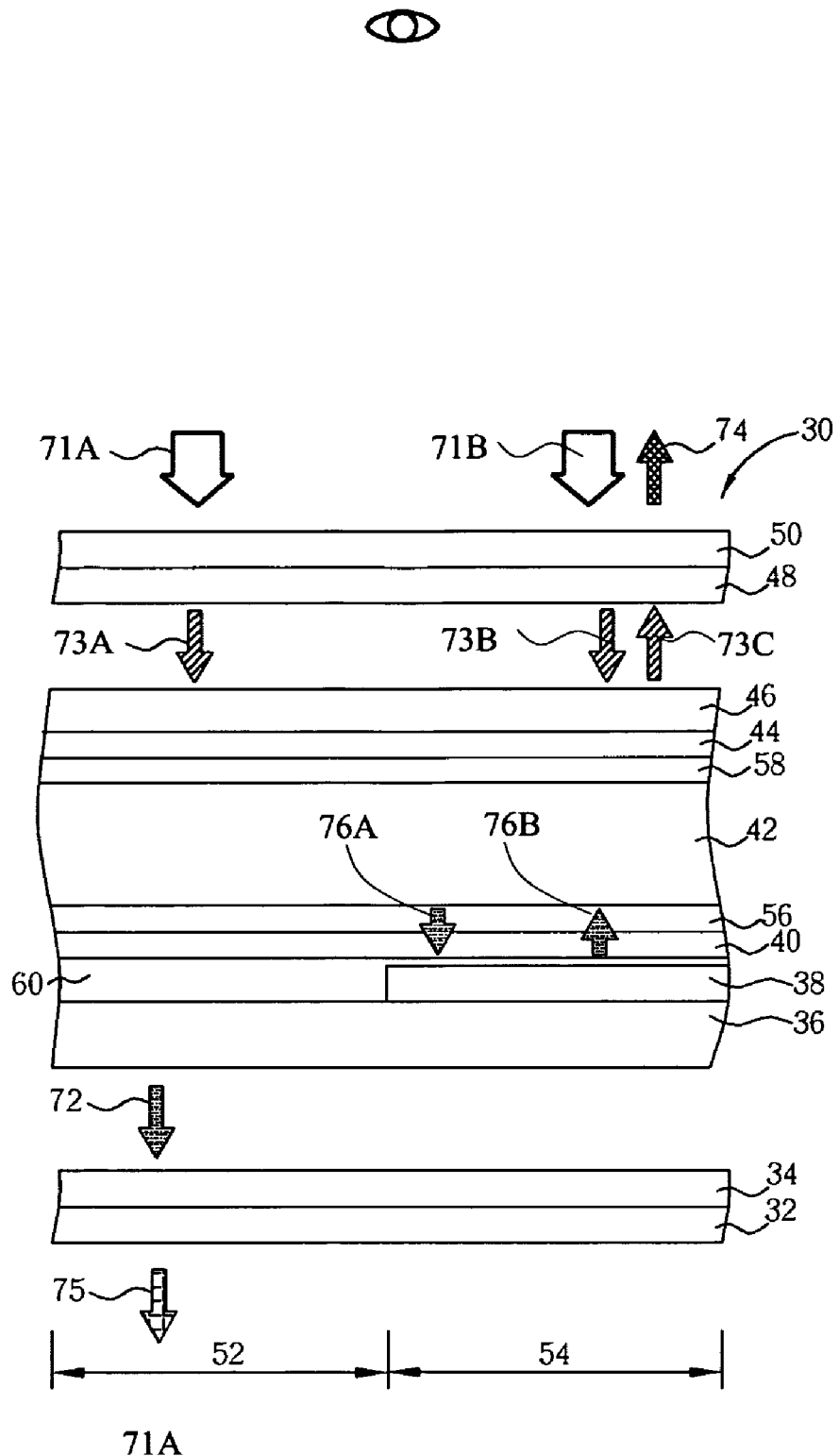
FIG. 8 is a schematic diagram of the LCD device shown in FIG. 7 using an ambient lighting source.

In a different scenario, when the light source used originates from ambient light, the light paths are shown in FIG. 8. The ambient light includes non-polarized light 71A and non-polarized light 71B. In the transmissive area 52, the non-polarized light 71A travels down to pass through the second linear polarizer 50 and to produce linear polarized light. After the linear polarized light has passed through the second retardation film 48, the light becomes right-handed circular polarized light 73A, which travels down to pass through the liquid crystal layer 42 that is not subjected to any voltage and therefore has liquid crystal molecules aligned in a horizontal arrangement. The light that passes through the liquid crystal layer 42 becomes left-handed rotation circular polarized light 72. Part of the left-handed rotation circular polarized light 72 passes through the transmissive area 52 of the pixel unit while remaining a left-handed rotation circular polarized light 72. The light 72 further travels down to pass through the first retardation film 34 to form linear polarized light. As this linear polarized light has the same direction as the first linear polarizer 32, the linear polarized light can pass through the first linear polarizer 32 and exit as linear polarized light 75.

In the transreflective area 54 of the pixel unit, the incident light 71B passes through the second linear polarizer 50 and second retardation film 48 to become right-handed rotation circular light 73B. The light becomes left-handed rotation circular polarized light 76A after passing through the liquid crystal layer 42. The light 76A travels down to pass through the lower alignment film 56, the lower transparent electrode 40, and the overcoat 60, and arrives at the circular polarized light selecting membrane 38. Since the light selecting membrane 38 includes a left-handed rotation cholesteric liquid crystal, the light 76A is unable to pass through the circular polarized light selecting membrane 38. Instead, the light 76A is reflected back and remains a left-handed rotation circular polarized light 76B. After the light 76B travels up and passes through the overcoat 60, the transparent electrode 40, and the lower alignment film 56, the light 76B remains a left-handed rotation circular polarized light. This light becomes right-handed rotation circular polarized light 73C after traveling through the liquid crystal layer 42. The light 73C becomes linear polarized light 74 after traveling through the second retardation film 48 and second linear polarizer 50. A user can thus view a brighter state display region in the transreflective area 54 due to emission of the light 74. Note that the transmissive area 52 of the pixel unit provides a darker state display image region.

In the above embodiments, a brighter state display can be achieved using the backlight source or the ambient light source, when no voltage is applied to the liquid crystal layer 42.

Again referring to the configuration of FIG. 7 and FIG. 8, when a fully "on" voltage is applied to the liquid crystal layer, the liquid crystals are aligned in a vertical arrangement so that the light wave phase is not retarded, i.e., $\Delta n \times d = 0$. Therefore, when using the same backlight source of FIG. 7, the left-handed rotation circular polarized light 72A which travels through the transmissive area 52 will remain a left-handed rotation circular polarized light after it has passed through the liquid crystal layer 42, and form a linear polarized light after it continues to travel and arrives at the second retardation film 48. Since this linear polarized light has different direction from the direction of the second polarizer 50, it cannot pass through the second linear polarizer 50. Therefore, in this condition (fully "on" voltage applied to liquid crystal layer 42), what the user views is the darker state display region on the transmissive area 52.

Also, in FIG. 7, the left-handed rotation circular polarized light 72B which travels through the transreflective area 54 cannot pass through the circular polarized light selecting membrane 38. Instead, it is reflected back through the first retardation film 34 of the quarter-wave plate and the first linear polarizer 32 to exit to form the linear polarized light 75. Therefore, in this situation, what the user views in the transreflective area 54 is also a darker state display region. In other words, when a fully "on" voltage is applied to the liquid crystal layer 42 and a backlight source is used, both the transmissive and transreflective regions 52, 54 provide darker state display regions.

In the case where a fully "on" voltage is applied to the liquid crystal layer and the ambient light source is used, as in FIG. 8, the right-handed rotation circular polarized light 73A which is formed when passing through the second linear polarizer 50 and the second retardation film 48, travels down through the liquid crystal layer 42 while remaining a right-handed rotation circular polarized light 72. In the transmissive area 52, the light 72 progresses and forms linear polarized light after passing through the first retardation film 34. Since the direction of this linear polarized light is different from the direction of the first polarizer 32, the linear polarized light cannot pass through the first polarizer 32. Therefore, in this situation, the user will view the darker state display region in the transmissive area 52.

Also, in FIG. 8, the right-handed rotation circular polarized light 73B which travels through the transreflective area 54 remains a right-handed rotation circular polarized light 76A after it has passed through the liquid crystal layer 42. The circular polarized light selecting membrane 38 includes left-handed rotation cholesteric liquid crystals, the light 76A can pass through the light selecting membrane 38. The light continues to travel through the first retardation film 34 and the first linear polarizer 32 but cannot pass through. Therefore, in this situation, the user will also view the darker state display in the transreflective area 54.

With the embodiment of FIGS. 7 and 8, when either the backlight source or the ambient light source is used, the darker state display images can be achieved when a fully "on" voltage is applied to the liquid crystal layer 42. Therefore, when different voltages, between off (or no voltage) and the fully "on" voltage, are applied to the liquid crystals according to different image signals generated in the LCD device, the requirements for various gray levels can be satisfied in this configuration with either the backlight source or the ambient light source, and the desired display of the pixels can be viewed. Together with a color filter, a color LCD device can also be created. When the voltage applied to a pixel unit is between off and fully "on," a corresponding gray scale level is displayed. When no voltage is applied to the pixel unit, $\Delta n \times d = \lambda/2$, and the pixel unit will display the brightest level. However, when a fully "on" voltage is applied to the pixel unit, $\Delta n \times d = 0$, and the pixel unit will display the darkest level. Intermediate applied voltages will correspond to $\Delta n \times d$ values between 0 and $\lambda/2$ to result in intermediate brightness levels (various gray levels).

By using the rotation polarization feature of a circular polarized light generation device and the left-handed and right-handed rotation property of the circular polarized light selecting membrane, as well as the initial mode of the liquid crystals in the liquid crystal layer, various embodiments of an LCD device can be provided. A first embodiment of the LCD device includes: a first circular polarized light generation device (e.g., 31 in FIG. 6) that is a left-handed rotation polarized light generation device which includes, for example, a linear polarizer and a quarter-wave plate; a circular polarized light selecting membrane (e.g., 38 in FIG. 6) that is made of left-handed rotation cholesteric liquid crystals; and a second circular polarized light generation device (e.g., 51 in FIG. 6) that is a right-handed rotation circular polarized light generation device which includes, for example, a linear polarizer and a quarter-wave plate. This embodiment is described above in connection with FIGS. 7 and 8. The display results produced in the transmissive area and the transreflective area are summarized in Table 1 below.

TABLE 1

(First Embodiment)

| Light Wave Phase Retardation | Light source | Bright & dark results of the display | |
|---|---|---|---|
| | | Transmissive area | Transreflective area |
| $\Delta n \times d = \lambda/2$ | Backlight | Bright | Dark |
| | Ambient light | Dark | Bright |
| $\Delta n \times d = 0$ | Backlight | Dark | Dark |
| | Ambient light | Dark | Dark |

A second embodiment of an LCD device includes: a first circular polarized light generation device that is a right-handed rotation polarized light generation device which includes, for example, a linear polarizer and a quarter-wave plate; a circular polarized light selecting membrane that is made of right-handed rotation cholesteric liquid crystals; and a second circular polarized light generation device that is a left-handed rotation circular polarized light generation device which includes, for example, a linear polarizer and a quarter-wave plate. The display results produced in the transmissive area and transreflective area for this second embodiment are summarized in Table 2 below.

TABLE 2

(Second Embodiment)

| Light Wave Phase Retardation | Light source | Bright & dark results of the display | |
|---|---|---|---|
| | | Transmissive area | Transreflective area |
| $\Delta n \times d = \lambda/2$ | Backlight | Bright | Dark |
| | Ambient light | Dark | Bright |
| $\Delta n \times d = 0$ | Backlight | Dark | Dark |
| | Ambient light | Dark | Dark |

As indicated by the results listed in Table 1 and Table 2, when the liquid crystals are aligned in the horizontal orientation, it is the normally bright condition, and when the liquid crystals are aligned in vertical orientation, it is the normally dark condition.

Two types of LCD device can be used with the first and second embodiments represented by Tables 1 and 2. In a first type of LCD device, when no voltage is applied, the first type LCD device has the liquid crystals aligned in the horizontal orientation and $\Delta n \times d = \lambda/2$. When a fully "on" voltage is applied, the first type LCD device has the liquid crystals aligned in the vertical orientation and $\Delta n \times d = 0$.

The second type LCD device is the opposite of the first type LCD device. When no voltage is applied, the second type LCD device has the liquid crystals aligned in the vertical orientation and $\Delta n \times d = \lambda/2$. When fully "on" voltage is applied, the second type LCD device has the liquid crystals aligned in the horizontal orientation and $\Delta n \times d = 0$.

A third embodiment of an LCD device includes: a first circular polarized light generation device that is a left-handed rotation polarized light generation device which includes, for example, a linear polarizer and a quarter-wave plate; a circular polarized light selecting membrane that is made of left-handed rotation cholesteric liquid crystals; and a second circular polarized light generation device that is a left-handed rotation circular polarized light generation device which includes, for example, a linear polarizer and a quarter-wave plate. The display results produced in the transmissive area and transreflective area of this third embodiment are summarized in Table 3 below.

TABLE 3

(Third Embodiment)

| Light Wave<br>Phase Retardation | Light source | Bright & dark results of the display | |
|---|---|---|---|
| | | Transmissive area | Transreflective area |
| Δn × d = λ/2 | Backlight | Dark | Dark |
| | Ambient light | Dark | Dark |
| Δn × d = 0 | Backlight | Bright | Dark |
| | Ambient light | Dark | Bright |

A fourth embodiment of an LCD device includes: a first circular polarized light generation device that is a right-handed rotation polarized light generation device which includes, for example, a linear polarizer and a quarter-wave plate; a circular polarized light selecting membrane that made of right-handed rotation cholesteric liquid crystals; and a second circular polarized light generation device that is a right-handed rotation circular polarized light generation device which includes, for example, a linear polarizer and a quarter-wave plate. The display results produced in the transmissive area and transreflective area of the fourth embodiment are summarized in Table 4 below.

TABLE 4

(Fourth Embodiment)

| Light Wave<br>Phase Retardation | Light source | Bright & dark results of the display | |
|---|---|---|---|
| | | Transmissive area | Transreflective area |
| Δn × d = λ/2 | Backlight | Dark | Dark |
| | Ambient light | Dark | Dark |
| Δn × d = 0 | Backlight | Bright | Dark |
| | Ambient light | Dark | Bright |

As indicated by the results listed in Table 3 and Table 4, when the liquid crystals are aligned in a horizontal orientation, it is the normally dark condition, and when the liquid crystals are aligned in a vertical orientation, it is the normally bright condition. Again, similar to the discussion of the embodiments of Tables 1 and 2, the embodiments of Tables 3 and 4 can also be used with the two types of LCD devices.

Figure 9:
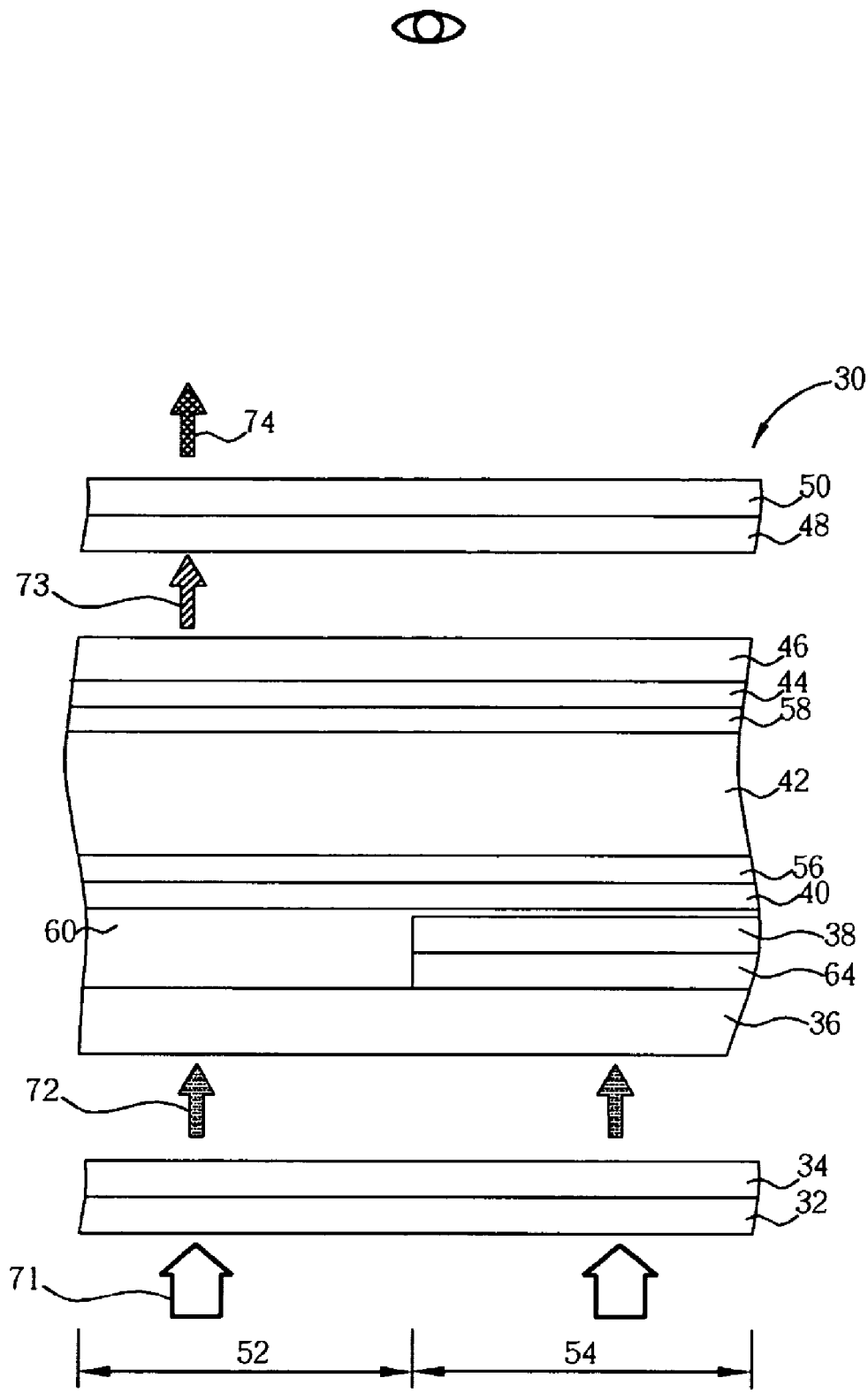
FIG. 9 is a schematic diagram of an LCD device according to a further embodiment.
Figure 10:
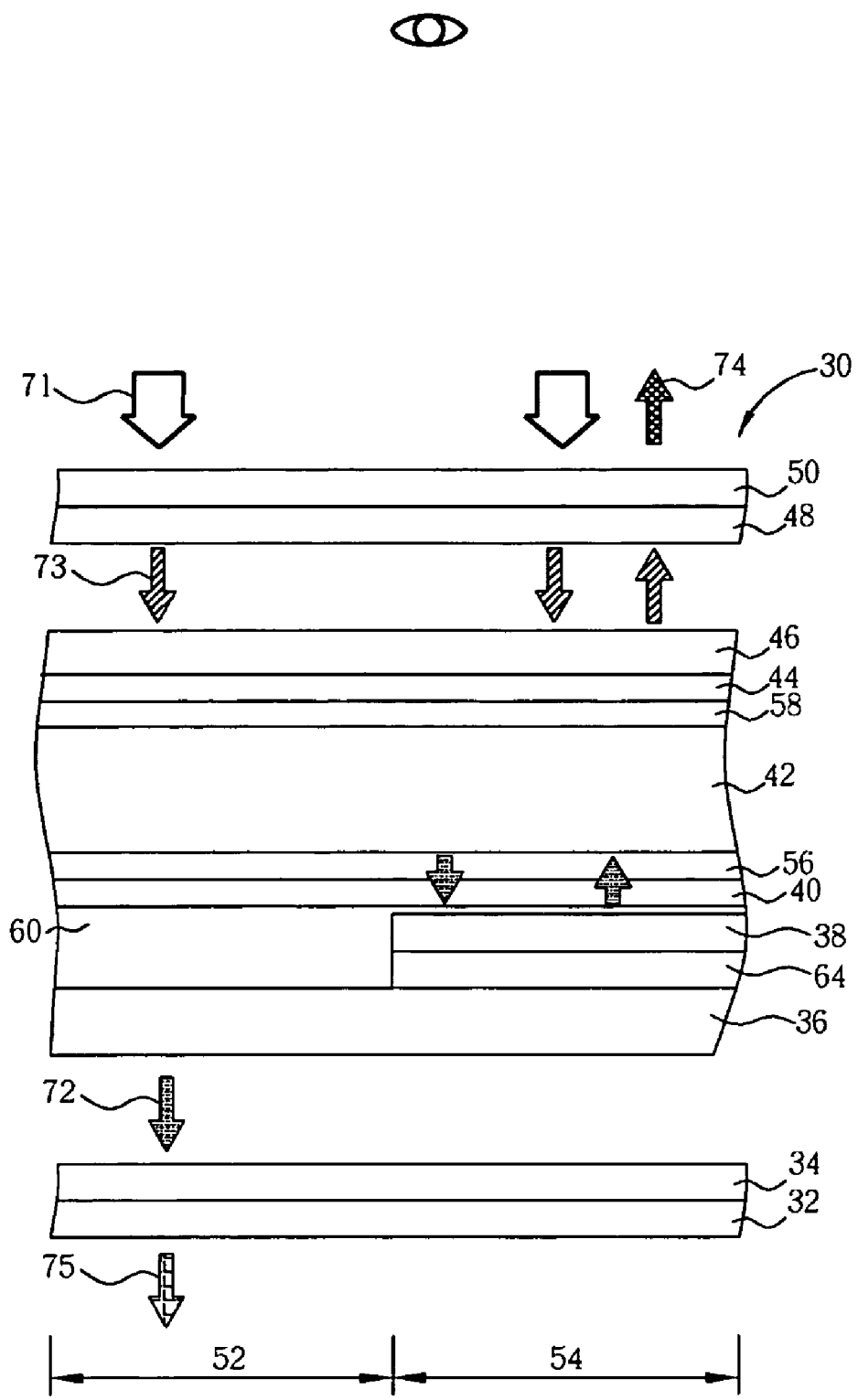
FIG. 10 is a schematic diagram of the LCD device shown in FIG. 9 using an ambient lighting source.

FIGS. 9 and 10 illustrate another embodiment of an LCD device. The components of the embodiment of FIGS. 9 and 10 are similar to those of FIGS. 7 and 8, except that a light absorption layer 64 is added in the transreflective area 54 of FIGS. 9 and 10. The light absorption layer 64 is located below the circular polarized light selecting membrane 38. The function of this light absorption area 64 is to absorb the light passing down through the circular polarized light selecting membrane 38, so that light leakage can be eliminated for the LCD panel. The material of the light absorption layer can be, for example, black resin.

The configuration and the brighter and darker display regions of the LCD device with the light absorption layer 64 in FIGS. 9 and 10 are similar to those of FIGS. 7 and 8 described above. The light absorption layer 64 can be placed anywhere as long as it can absorb undesirable light. Thus, the light absorption layer 64 can also be placed below the lower substrate 36 in another embodiment.

Figure 11:
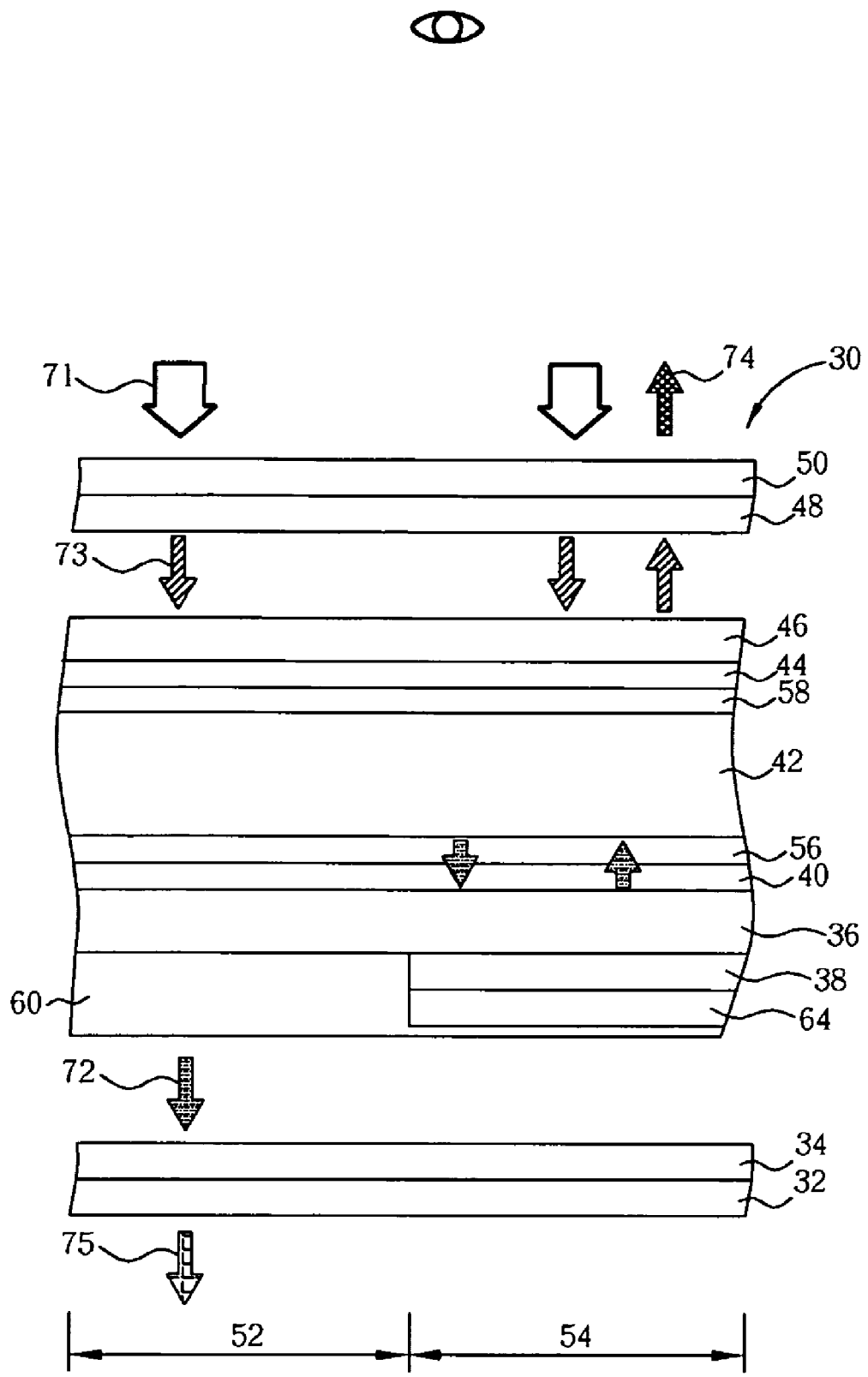
FIG. 11 is a schematic diagram of an LCD device according to yet another embodiment.

In yet another embodiment, as shown in FIG. 11, when the circular polarized light selecting membrane 38 is located below the lower substrate 36, the light absorption layer 64 can be located below the circular polarized light selecting membrane 38. An overcoat 60 can be formed on the surface of the light absorption layer 64 and the lower substrate 36 for stacking with the first retardation film 34.

Figure 12:
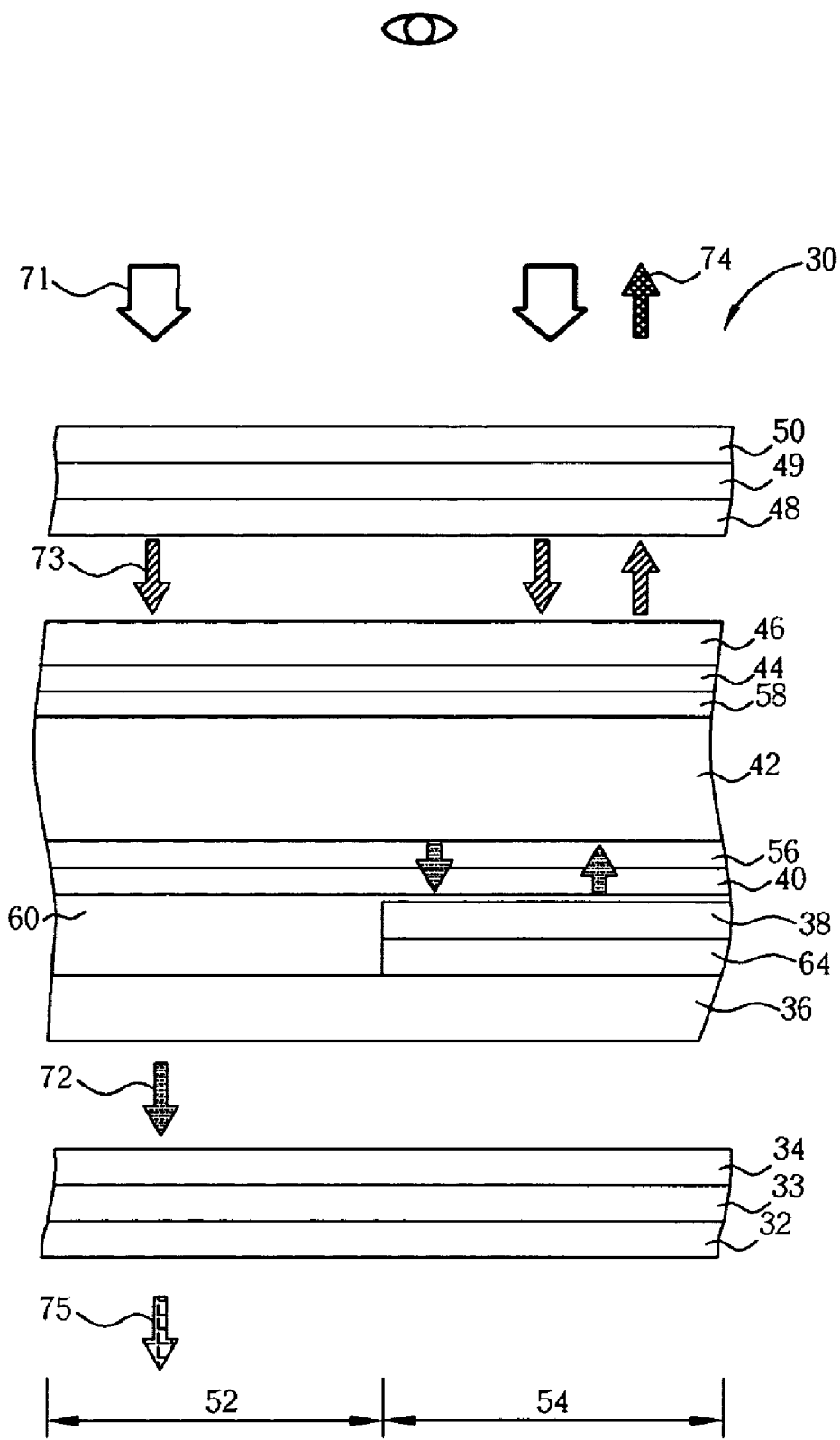
FIG. 12 a schematic diagram of an LCD device according to yet a further embodiment.

The reflective wavelength of the cholesteric liquid crystal has a certain range as shown in Equation 2 and Equation 3 below:

The center wavelength of the range is:

$$\lambda = n_{avg}/4 \times P,  \quad \text{(Equation 2)}$$

and the width of the frequency is:

$$\Delta\lambda = \Delta n/4 \times P = (n_e - n_o)/4 \times P, \quad \text{(Equation 3)}$$

where $n_{avg}$ is the average refractive index, P is the pitch of the liquid crystal, $n_e$ is the extraordinary refractive index, and no is the ordinary refractive index. If the frequency width of the reflective wavelength is too narrow, the wavelength of the reflected light will not be able to cover the entire white light, which may cause an inability to display normally white color. To address this issue, a half-wave plate can be added between the polarizer and the quarter-wave plate to increase the frequency width of the circular polarized light formed by the incident light, so that the reflective frequency width can be increased. Taking the LCD device 30 shown in FIG. 12 as an example, a first half-wave plate 33 can be installed between the first linear polarizer 32 and the first retardation film 34, and a second half-wave plate 49 can be installed between the second linear polarizer 50 and the second retardation film 48.

LCD devices according to some embodiments can be manufactured with existing manufacturing technologies. In one implementation, a lift-off technique can be used for producing the circular polarized light selecting membrane. For example, a light resistant layer is first formed on a glass substrate. Next, the light resistant material in the transreflective area is removed with a micro-photographic etching technique, and the transreflective area is covered with a layer of circular polarized light selecting membrane material (e.g. cholesteric liquid crystal). The remaining light resistant material is lifted off along with the circular polarized light selecting membrane material on the light resistant material. As a result, the desired circular polarized light selecting membrane material is left in the transreflective area of the glass substrate.

Another preparation technique involves first forming an overcoat on the glass substrate. Intaglio areas are defined on the overcoat and filled with circular polarized light selecting membrane material (e.g. cholesteric liquid crystal) to form the circular polarized light selecting membrane in the transreflective area. Yet another alternative is to use a micro-photographic etching technique, where the glass substrate is covered first with a layer of circular polarized light selecting membrane material and subsequently with a layer of light resistant material as protection. Then the circular polarized light selecting membrane material which is not covered by the light resistant material is directly removed by using, for example, hydrofluoric acid (HF), leaving the desired part of the circular polarized light selecting membrane on the glass substrate.

When using the cholesteric liquid crystal as the circular polarized light selecting membrane material, its pitch can be adjusted to the desired level by adding a chiral agent. As another example for preparation of the liquid crystal layer, an alignment film can be used for the aligning process to achieve a target arrangement of liquid crystals in the liquid crystal layer.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A display device including:
a lower substrate;
an upper substrate located above and generally parallel with the lower substrate; and
a plurality of pixel units located between the lower substrate and the upper substrate, each pixel unit including a transmissive area and a transreflective area separate from the transmissive area,
wherein the transmissive area allows light to pass through, and the transreflective area includes a light selecting membrane to selectively allow light having a first characteristic to pass through and to reflect light having a second characteristic,
wherein the transreflective area further includes a light absorption layer between the light selecting membrane and the lower substrate.

2. display device of claim 1, wherein the light selecting membrane comprises a circular polarized light selecting membrane that allows light having a first polarization to pass through and that reflects light having a second polarization.

3. The display device of claim 2, wherein the circular polarized light selecting membrane includes a helical cholesteric liquid crystal.

4. The display device of claim 1, wherein the light absorption layer is made of a material including black resin.

5. A liquid crystal display (LCD) device including:
a lower substrate;
an upper substrate located above and generally parallel with the lower substrate; and
a plurality of pixel units located between the lower substrate and the upper substrate, each pixel unit including an upper transparent electrode, a liquid crystal layer, and a lower transparent electrode, and each pixel unit having a transmissive area and a transreflective area separate from the transmissive area,
wherein the transmissive area allows light to pass through, and the transreflective area includes a light selecting membrane to selectively allow the light having a first characteristic to pass through and to reflect light having a second characteristic,
wherein the transreflective area further includes a light absorption layer to absorb light passing through, the light absorption layer being between the light selecting membrane and the lower substrate.

6. The LCD device of claim 5, further comprising:
a first circular polarized light generation device located below the lower substrate; and
a second circular polarized light generation device located above the upper substrate.

7. The LCD device of claim 5, wherein the light selecting membrane comprises a circular polarized light selecting membrane.

8. The LCD device of claim 7, wherein the circular polarized light selecting membrane includes a helical cholesteric liquid crystal.

9. The LCD device of claim 6, wherein the first circular polarized light generation device includes a layered stack of a first linear polarizer and a first retardation film, and the second circular polarized light generation device includes a layered stack of a second linear polarizer and a second retardation film.

10. The LCD device of claim 9, wherein the first retardation film is a quarter-wave plate, and the second retardation film is a quarter-wave plate.

11. The LCD device of claim 10, further comprising a first half-wave plate located between the first retardation film and the first linear polarizer, and a second half-wave plate located between the second retardation film and the second linear polarizer.

12. The LCD device of claim 5, wherein the liquid crystal layer has a thickness such that the thickness multiplied by a difference between an ordinary reflective index and an extraordinary reflective index of liquid crystals contained in the liquid crystal layer is between 0 and ½ of the wavelength of incident light.

13. The LCD device of claim 6, wherein the first circular polarized light generation device produces right-handed rotation circular polarized light, and the second circular polarized light generation device produces left-handed rotation circular polarized light, and the light selecting membrane includes a circular polarized light selecting membrane that reflects the left-handed rotation circular polarized light and allows the right-handed rotation circular polarized light to pass through.

14. The LCD device of claim 6, wherein the first circular polarized light generation device produces left-handed rotation circular polarized light, and the second circular polarized light generation device produces right-handed rotation circular polarized light, and the light selecting membrane includes a circular polarized light selecting membrane that reflects the right-handed rotation circular polarized light and allows the left-handed rotation circular polarized light to pass through.

15. The LCD device of claim 6, wherein the first circular polarized light generation device is a left-handed rotation polarized light generation device, the second circular polarized light generation device is a left-handed rotation polarized light generation device, and the light selecting membrane reflects the left-handed rotation circular polarized light and allows the right-handed rotation circular polarized light to pass through.

16. The LCD device of claim 6, wherein the first circular polarized light generation device is a right-handed rotation polarized light generation device, the second circular polarized light generation device is a right-handed rotation polarized light generation device, and the light selecting membrane reflects the right-handed rotation circular polarized light and allows the left-handed rotation circular polarized light to pass through.

17. The LCD device of claim 5, wherein the light selecting membrane is located between the lower substrate and the lower transparent electrode.

18. The LCD device of claim 5 further comprising an overcoat covering the light selecting membrane and the lower substrate to form a flat surface.

19. The LCD device of claim 6, wherein the light selecting membrane is located between the lower substrate and the second circular polarized light generation device.

20. The LCD device of claim 5, wherein the light absorption layer is made of a material including black resin.

21. A liquid crystal display (LCD) device including:
a lower substrate;
an upper substrate located above and generally parallel with the lower substrate;
a plurality of pixel units located between the lower substrate and the upper substrate, each pixel unit including an upper transparent electrode, a liquid crystal layer, and a lower transparent electrode, and each pixel unit having a transmissive area and a transreflective area separate from the transmissive area, wherein the transmissive area allows light to pass through, and the transreflective area includes a light selecting membrane to selectively allow the light having a first characteristic to pass through and to reflect light having a second characteristic, wherein the transreflective area further includes a light absorption layer to absorb light passing through; and a backlight source, wherein the light selecting membrane is located between the lower substrate and the light absorption layer, wherein light from the backlight source absorbed by the light absorption layer does not pass to the lower substrate.

* * * * *

UNITED STATES PATENT AND TRADEMARK OFFICE
CERTIFICATE OF CORRECTION

| | | |
|---|---|---|
| PATENT NO. | : 7,619,704 B2 | Page 1 of 1 |
| APPLICATION NO. | : 11/430360 | |
| DATED | : November 17, 2009 | |
| INVENTOR(S) | : Cheng-Jen Chu et al. | |

It is certified that error appears in the above-identified patent and that said Letters Patent is hereby corrected as shown below:

Column 11:
Line 25, before "display" insert --The--.

Signed and Sealed this

Sixteenth Day of February, 2010

David J. Kappos
*Director of the United States Patent and Trademark Office*